United States Patent
Okada et al.

(10) Patent No.: US 11,326,051 B2
(45) Date of Patent: May 10, 2022

(54) METHOD FOR PRODUCING OXYMETHYLENE POLYMER AND OXYMETHYLENE POLYMER RESIN COMPOSITION

(71) Applicant: MITSUBISHI GAS CHEMICAL COMPANY, INC., Tokyo (JP)

(72) Inventors: Takuya Okada, Mie (JP); Daisuke Sunaga, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/293,566

(22) PCT Filed: Jun. 10, 2020

(86) PCT No.: PCT/JP2020/022908
§ 371 (c)(1),
(2) Date: May 13, 2021

(87) PCT Pub. No.: WO2020/250945
PCT Pub. Date: Dec. 17, 2020

(65) Prior Publication Data
US 2022/0056259 A1 Feb. 24, 2022

(30) Foreign Application Priority Data

Jun. 11, 2019 (JP) ............................. JP2019-108702

(51) Int. Cl.
*C08L 59/04* (2006.01)
*C08G 2/04* (2006.01)
(Continued)

(52) U.S. Cl.
CPC ................ *C08L 59/04* (2013.01); *C08G 2/04* (2013.01); *C08G 2/06* (2013.01); *C08G 2/10* (2013.01); *C08K 5/55* (2013.01); *C08G 2650/44* (2013.01)

(58) Field of Classification Search
None
See application file for complete search history.

(56) References Cited

U.S. PATENT DOCUMENTS 6,072,021 A * 6/2000 Adelman ................. C08G 2/06
528/250
9,902,797 B2 * 2/2018 Nakaya .................... C08G 4/00
(Continued)

FOREIGN PATENT DOCUMENTS

| JP | 2003-510374 A | 3/2003 |
| JP | 2007-246464 A | 9/2007 |

(Continued)

OTHER PUBLICATIONS

Extended European Search Report issued to the corresponding European Patent Application No. 20823494.8 dated Mar. 10, 2022.
(Continued)

*Primary Examiner* — Satya B Sastri
(74) *Attorney, Agent, or Firm* — Greenblum & Bernstein, P.L.C.

(57) ABSTRACT

It has been desired to develop a method for producing an oxymethylene polymer, by which an oxymethylene polymer having a high polymerization degree can be produced with high efficiency while suppressing increase in the amount of generation of an odor. Further, it has been desired to develop an oxymethylene polymer resin composition, wherein generation of an odor at the time of molding or after molded to obtain a molded body is suppressed. The present invention provides a method for producing an oxymethylene polymer, wherein the oxymethylene polymer is produced by polym-
(Continued)

erizing a cyclic oligomer of formaldehyde, and wherein a boron trifluoride compound and an aryl fluoride boron compound are used as polymerization catalysts. The present invention also provides an oxymethylene polymer resin composition containing an oxymethylene polymer and a derivative of an aryl fluoride boron compound.

13 Claims, 4 Drawing Sheets

(51) Int. Cl.
 C08G 2/06 (2006.01)
 C08G 2/10 (2006.01)
 C08K 5/55 (2006.01)

(56) References Cited

U.S. PATENT DOCUMENTS

2015/0112018 A1    4/2015  Nakaya et al.
2015/0337070 A1*  11/2015  Müller .................. C08G 64/32
                                                                528/237
2016/0090445 A1*   3/2016  Hirano .................... C08G 2/06
                                                                528/408
2016/0115270 A1*   4/2016  Pottie ....................... C08G 2/18
                                                                528/232

FOREIGN PATENT DOCUMENTS

JP       2009-1762 A       1/2009
JP       2011-137087 A     7/2011
WO       WO 2013/172270 A1  11/2013
WO       WO 2014/196385 A1  12/2014

OTHER PUBLICATIONS

ISR for PCT/JP2020/022908, dated Sep. 1, 2020.
Notice of Reasons for Rejection for JP App. No. 2020-553671, dated Dec. 17, 2020 (w/translation).
Grant Decision for JP App. No. 2020-553671, dated Mar. 17, 2021 (w/translation).

* cited by examiner

METHOD FOR PRODUCING OXYMETHYLENE POLYMER AND OXYMETHYLENE POLYMER RESIN COMPOSITION

TECHNICAL FIELD

The present invention relates to a method for producing an oxymethylene polymer, wherein a boron trifluoride compound and an aryl fluoride boron compound are used, and an oxymethylene polymer resin composition.

BACKGROUND ART

Oxymethylene polymers are also called polyacetal and classified into a homopolymer in which formaldehyde is polymerized and a copolymer in which a cyclic oligomer such as trioxane and a comonomer are polymerized.

Oxymethylene polymers have an excellent balance between mechanical properties, chemical resistance, slidability, etc., and can be easily processed. For this reason, as typical engineering plastics, oxymethylene polymers are widely used mainly for electrical and electronic parts, automobile parts and other various machine parts.

When carrying out industrial mass production of an oxymethylene polymer, there has been concern for problems regarding stable production and for reduction in the yield since a large amount of unreacted trioxane is vaporized due to increase in the resin temperature in a polymerization reaction machine. Meanwhile, in order to produce a high rigidity grade oxymethylene copolymer, reduction in the amount of a comonomer is required for increasing the degree of crystallization. However, in this case, there has been concern for reduction in the yield since a large amount of unreacted trioxane is vaporized due to significant increase in the reaction temperature that is caused by high reaction activity.

For solving problems regarding stable production and the problem of reduction in the yield caused by vaporized unreacted trioxane, Patent Document 1 discloses a method for producing a polyacetal copolymer, wherein (a) trioxane, (b) a cyclic ether and/or a cyclic formal and (c) a tertiary amine compound are mixed, followed by adding a polymerization catalyst thereto. In the production method of Patent Document 1, by adding a large amount of the tertiary amine compound as a polymerization activity control agent to be mixed with the monomer before the addition of the catalyst, vaporization of the unreacted monomer is suppressed to produce the polyacetal copolymer at a high yield. However, from the viewpoint of producing a high-molecular-weight oxymethylene polymer with high efficiency, it has been required to establish a method different from the production method of Patent Document 1.

PRIOR ART DOCUMENTS

Patent Documents

Patent Document 1: Japanese Laid-Open Patent Publication No. 2011-137087

SUMMARY OF THE INVENTION

Problems to be Solved by the Invention

It has been desired to develop a method for producing an oxymethylene polymer, by which an oxymethylene polymer having a high polymerization degree can be produced with high efficiency.

Further, it has been desired to develop an oxymethylene polymer resin composition, wherein generation of an odor at the time of molding or after molded to obtain a molded body is suppressed.

Means for Solving the Problems

According to the present invention, the followings are provided.

[1] A method for producing an oxymethylene polymer, wherein the oxymethylene polymer is produced by polymerizing a cyclic oligomer of formaldehyde, and wherein a boron trifluoride compound (A) represented by $BF_3 \cdot (X)_n$ (wherein n represents 0 or 1, and X represents an alkyl ether having 2 to 20 carbon atoms, tetrahydrofuran or phenol) and an aryl fluoride boron compound (B) are used as polymerization catalysts.

[2] The method for producing an oxymethylene polymer according to item [1], wherein said X is at least one selected from the group consisting of dimethyl ether, diethyl ether and dibutyl ether.

[3] The method for producing an oxymethylene polymer according to item [1] or [2], wherein the aryl fluoride boron compound (B) is at least one selected from the group consisting of tris(pentafluorophenyl)borane, bis(pentafluorophenyl)fluoroborane and pentafluorophenyldifluoroborane, and hydrates thereof.

[4] The method for producing an oxymethylene polymer according to any one of items [1] to [3], wherein the aryl fluoride boron compound (B) is used at a molar ratio in a range of 0.0001 or more but less than 1 relative to the boron trifluoride compound (A).

[5] The method for producing an oxymethylene polymer according to any one of items [1] to [4], wherein the aryl fluoride boron compound (B) is mixed with the boron trifluoride compound (A) in advance to prepare a polymerization catalyst mixture and the polymerization catalyst mixture is used.

[6] The method for producing an oxymethylene polymer according to any one of items [1] to [5], wherein the cyclic oligomer is trioxane.

[7] The method for producing an oxymethylene polymer according to any one of items [1] to [6], wherein the cyclic oligomer is used as a principal monomer and the principal monomer and a comonomer are copolymerized.

[8] The method for producing an oxymethylene polymer according to item [7], wherein the comonomer is a cyclic ether or a cyclic formal, and wherein the cyclic ether or cyclic formal has at least one carbon-carbon bond.

[9] The method for producing an oxymethylene polymer according to item [7] or [8], wherein the comonomer is copolymerized in an amount of 0.1 to 20 parts by mass relative to 100 parts by mass of the principal monomer.

[10] The method for producing an oxymethylene polymer according to any one of items [7] to [9], wherein the boron trifluoride compound (A) is used in an amount of $1 \times 10^{-6}$ mol to $1 \times 10^{-4}$ mol relative to 1 mol of the principal monomer.

[11] An oxymethylene polymer resin composition, which contains an oxymethylene polymer containing an oxymethylene unit and a derivative of an aryl fluoride boron compound.

[12] The oxymethylene polymer resin composition according to item [11], wherein the oxymethylene polymer is an oxymethylene copolymer containing an oxymethylene unit and an oxyalkylene unit having 2 or more carbon atoms.

[13] The oxymethylene polymer resin composition according to item [11] or [12], wherein the derivative of the aryl fluoride boron compound is a fluorine adduct of the aryl fluoride boron compound.

[14] The oxymethylene polymer resin composition according to any one of items [11] to [13], wherein the aryl fluoride boron compound is at least one selected from the group consisting of tris(pentafluorophenyl)borane, bis(pentafluorophenyl)fluoroborane and pentafluorophenyldifluoroborane, and hydrates thereof.

[15] The oxymethylene polymer resin composition according to item [13] or [14], wherein the fluorine adduct of the aryl fluoride boron compound is derived from the aryl fluoride boron compound and a boron trifluoride compound represented by $BF_3 \cdot (X)_n$ (wherein n represents 0 or 1, and X represents an alkyl ether having 2 to 20 carbon atoms, tetrahydrofuran or phenol), and wherein the molar ratio of the amount of boron derived from the aryl fluoride boron compound (B1) to the amount of boron derived from the boron trifluoride compound (B2) (B1/B2) is 0.0001 to 0.1.

Effects of the Invention

According to the production method of the present invention, an oxymethylene polymer having a high polymerization degree can be produced with high efficiency by using a boron trifluoride compound (A) and an aryl fluoride boron compound (B) as polymerization catalysts. In addition, increase in the amount of generation of an odor can be suppressed.

Further, by using the oxymethylene copolymer resin composition of the present invention, generation of an odor at the time of molding or after molded to obtain a molded body can be suppressed.

MODE FOR CARRYING OUT THE INVENTION

Figure 1:
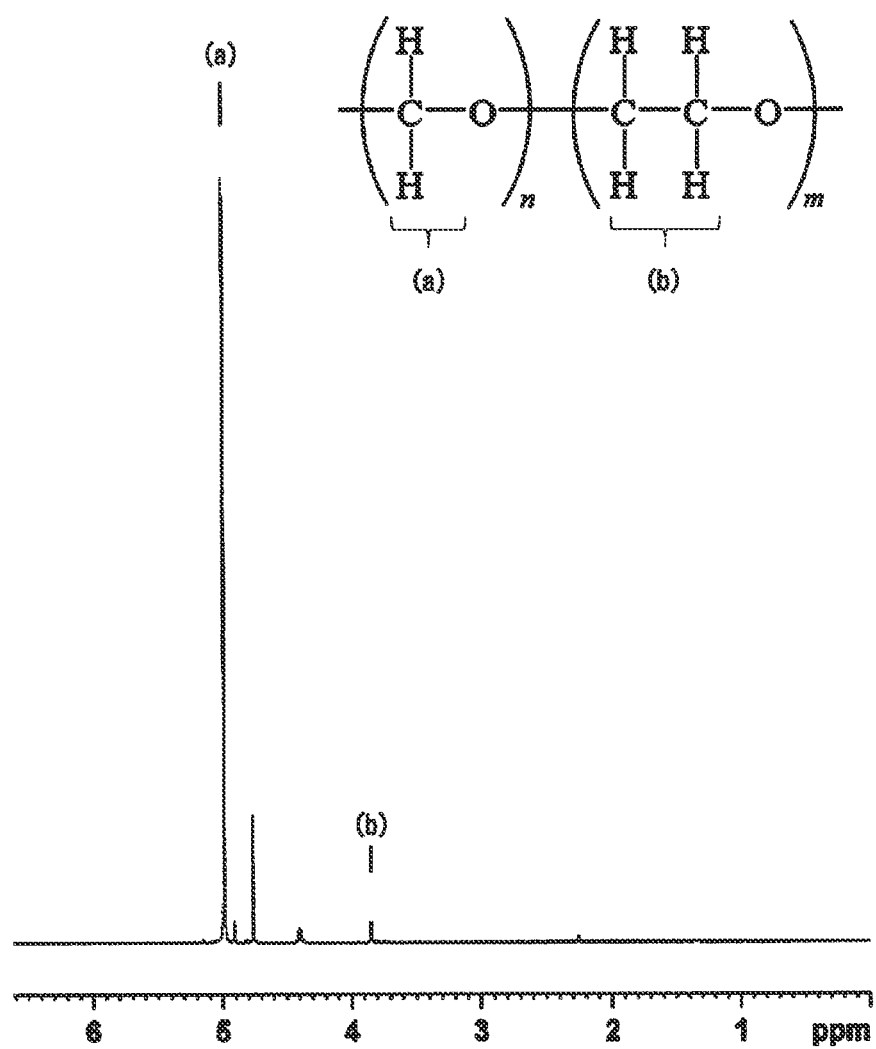
FIG. 1 shows a 1H-NMR spectrum of the sample obtained in Example 7.

One embodiment of the present invention relates to a method for producing an oxymethylene polymer, wherein the oxymethylene polymer is produced by polymerizing a cyclic oligomer of formaldehyde (hereinafter sometimes referred to as "the production method of the present invention").

Oxymethylene polymers are also called polyacetal and classified into a homopolymer and a copolymer. When this specification simply describes an "oxymethylene polymer", it means both a homopolymer and a copolymer. A homopolymer is called an "oxymethylene homopolymer" to be differentiated.

<Cyclic Oligomer>

As a raw material monomer, a cyclic oligomer of formaldehyde such as trioxane that is a cyclic trimer of formaldehyde and tetraoxane that is a cyclic tetramer of formaldehyde is used. As the cyclic oligomer, trioxane is preferred.

The trioxane is not particularly limited as long as it is a cyclic trimer of formaldehyde, and it may be either a commercial product or a product produced by a conventionally known production method. Further, the method for producing the trioxane is not particularly limited.

There is a case where trioxane contains water, formic acid, methanol and formaldehyde as impurities inevitably generated in the industrial production, but such a trioxane containing these impurities may also be used. In this case, the total amount of water, formic acid, methanol and formaldehyde in the trioxane is preferably 500 mass ppm or less, more preferably 450 mass ppm or less, and particularly preferably 400 mass ppm or less. Among them, the content of water is preferably 200 mass ppm or less, more preferably 100 mass ppm or less, and particularly preferably 50 mass ppm or less. When the amount of the impurities is too much, problems such as reduction in the polymerization degree and generation of an odor from an oxymethylene polymer product may be caused.

<Comonomer>

In the present invention, the above-described cyclic oligomer may be used as a principal monomer, and the principal monomer and a comonomer may be copolymerized. The comonomer is not particularly limited, but preferred is a cyclic ether or cyclic formal having at least one carbon-carbon bond. The reason thereof is as follows. When repeating of the oxymethylene unit constituting the main chain structure of the oxymethylene copolymer begins to be decomposed due to heat or the like, depolymerization occurs continuously to produce formaldehyde. However, since the carbon-carbon bond is stable, such a depolymerization becomes inactive at the point when it reaches a comonomer unit.

Examples of the cyclic ether or cyclic formal having at least one carbon-carbon bond include: oxepanes such as 1,3-dioxolane, 2-ethyl-1,3-dioxolane, 2-propyl-1,3-dioxolane, 2-butyl-1,3-dioxolane, 2,2-dimethyl-1,3-dioxolane, 2-phenyl-2-methyl-1,3-dioxolane, 4-methyl-1,3-dioxolane, 2,4-dimethyl-1,3-dioxolane, 2-ethyl-4-methyl-1,3-dioxolane, 4,4-dimethyl-1,3-dioxolane, 4,5-dimethyl-1,3-dioxolane, 2,2,4-trimethyl-1,3-dioxolane, 4-hydroxymethyl-1,3-dioxolane, 4-butyloxymethyl-1,3-dioxolane, 4-phenoxymethyl-1,3-dioxolane, 4-chloromethyl-1,3-dioxolane, 1,3-dioxabicyclo[3,4,0]nonane, ethylene oxide, propylene oxide, butylene oxide, epichlorohydrin, styrene oxide, oxythane, 3,3-bis(chloromethyl)oxetane, tetrahydrofuran and 1,3-dioxepane; oxocanes such as 1,3,6-trioxocane; and oxetanes. As the comonomer, a cyclic formal having an oxyalkylene group having 2 carbon atoms ($-OCH_2CH_2-$) is preferred, and 1,3-dioxolane is particularly preferred.

The blending amount of the comonomer may be suitably determined depending on the type of the comonomer, physical properties of an oxymethylene copolymer which is a final target substance, etc. but 0.1 to 20 parts by mass, and particularly 1 to 15 parts by mass relative to 100 parts by mass of the principal monomer are preferable.

<Polymerization Catalyst>

In the present invention, two catalysts, which are a boron trifluoride compound (A) and an aryl fluoride boron compound (B), are used as a polymerization catalyst. When the boron trifluoride compound (A) is used solely, it is difficult to achieve a balance between obtaining a high molecular weight oxymethylene polymer and obtaining high efficiency, and in addition, a problem of an odor related to molding is caused.

However, by combining the boron trifluoride compound (A) with the aryl fluoride boron compound (B) that is a highly active catalyst, a balance between obtaining a high molecular weight oxymethylene polymer and obtaining high efficiency can be achieved, and in addition, increase in an odor related to molding can be suppressed. Note that in the present invention, obtaining high efficiency means that the ratio of an unreacted monomer in a crude oxymethylene obtained in a polymerization process is reduced, resulting in a high POM content rate (described in detail later), or that an oxymethylene polymer is obtained in a high yield. When the POM content rate is high, the remaining amount of the monomer is small, and it has an advantage that energy required for recovery of the unreacted monomer can be reduced. When the yield is high, raw material saving and energy saving can be realized by the improvement of production efficiency, and it is possible to reduce the production cost.

In addition, by increasing the amount of a chain transfer agent, the amount of production can be further increased while ensuring production stability in the polymerization process. It will be described in detail below. In general, when the amount of production in the polymerization process is tried to be increased in the same production apparatus, the speed of heat removal becomes lower than the speed of increase in reaction heat during polymerization. As a result, a side reaction easily proceeds, the polymerization degree is not easily increased and MFR of products is increased, and for this reason, the amount of a chain transfer agent to be used must be decreased. In this regard, when the amount of the chain transfer agent to be used is nearly equal to zero, further increase in the amount of production can no longer be expected, and in addition, the polymerization degree of products cannot be regulated. As a result, the demand for increase in the amount of production in the polymerization process cannot be fulfilled. However, in the present invention, by using specific two polymerization catalysts, the amount of the chain transfer agent can be increased, and further increase in the amount of production can be achieved while avoiding problems of production stability such as progress of a side reaction and difficulty in increase of the polymerization degree.

The boron trifluoride compound (A) is a compound represented by formula $BF_3 \cdot (X)_n$. In the formula, n represents 0 or 1. X represents an alkyl ether having 2 to 20 carbon atoms, tetrahydrofuran or phenol. Preferably, X is at least one selected from the group consisting of dimethyl ether, diethyl ether and dibutyl ether.

The amount of the boron trifluoride compound (A) to be used may be suitably determined depending on polymerization conditions, etc., but the lower limit thereof is generally $1 \times 10^{-6}$ mol, and preferably $1 \times 10^{-5}$ mol relative to 1 mol of the principal monomer. The upper limit is generally $1 \times 10^{-3}$ mol, and preferably $1 \times 10^{-4}$ mol relative to 1 mol of the principal monomer.

Examples of the aryl fluoride boron compound (B) include tris(pentafluorophenyl)borane, bis(pentafluorophenyl)fluoroborane, pentafluorophenyldifluoroborane, tris(2,3,4,5-tetrafluorophenyl)boron, tris(2,3,4,6-tetrafluorophenyl)boron, tris(2,3,5,6-tetrafluorophenyl)boron, tris(2,3,5-trifluorophenyl)boron, tris(2,4,6-trifluorophenyl)boron, tris(1,3-difluorophenyl)boron, tris(2,3,5,6-tetrafluoro-4-methylphenyl)boron, tris(2,3,4,6-tetrafluoro-5-methylphenyl)boron, tris(2,4,5-trifluoro-6-methylphenyl) boron, tris(2,3,6-trifluoro-4-methylphenyl)boron, tris(2,4,6-trifluoro-3-methylphenyl)boron, tris(2,6-difluoro-3-methylphenyl)boron, tris(2,4-difluoro-5-methylphenyl)boron, tris(3,5-difluoro-2-methylphenyl)boron, tris(4-methoxy-2,3,5,6-tetrafluorophenyl)boron, tris(3-methoxy-2,4,5,6-tetrafluorophenyl)boron, tris(2-methoxy-3,5,6-trifluorophenyl)boron, tris(3-methoxy-2,5,6-trifluorophenyl)boron, tris(3-methoxy-2,4,6-trifluorophenyl)boron, tris(2-methoxy-3,5-difluorophenyl)boron, tris(3-methoxy-2,6-difluorophenyl)boron, tris(3-methoxy-4,6-difluorophenyl)boron, tris(2-methoxy-4,6-difluorophenyl)boron and tris(4-methoxy-2,6-difluorophenyl)boron. Hydrates thereof may also be used.

As the aryl fluoride boron compound (B), at least one selected from the group consisting of tris(pentafluorophenyl)borane, bis(pentafluorophenyl)fluoroborane and pentafluorophenyldifluoroborane, and hydrates thereof is preferably used.

The amount of the aryl fluoride boron compound (B) to be used may be suitably determined depending on polymerization conditions, etc., but the lower limit thereof is preferably $1 \times 10^{-8}$ mol, more preferably $5 \times 10^{-8}$ mol, and particularly preferably $1 \times 10^{-7}$ mol relative to 1 mol of the principal monomer. The upper limit is preferably $1 \times 10^{-5}$ mol, more preferably $5 \times 10^{-6}$ mol, and particularly preferably $1 \times 10^{-6}$ mol relative to 1 mol of the principal monomer.

The ratio between the boron trifluoride compound (A) and the aryl fluoride boron compound (B) may be suitably determined depending on MFR of the oxymethylene polymer which is the final target substance, etc., but the lower limit of the molar ratio of the aryl fluoride boron compound (B) to the boron trifluoride compound (A) is preferably 0.0001 or more, and particularly preferably 0.001 or more. The upper limit of the molar ratio of the aryl fluoride boron compound (B) to the boron trifluoride compound (A) is preferably less than 1, and particularly preferably 0.1 or less.

As long as the above-described two polymerization catalysts are used, a high polymerization degree and high efficiency can be achieved and increase in the amount of an odor generated can be suppressed without combined use of another catalyst. However, as appropriate, other than the above-described two polymerization catalysts, another polymerization catalyst may be further used in combination therewith.

The aryl fluoride boron compound (B), the boron trifluoride compound (A) and another polymerization catalyst to be used as appropriate may be separately put into a reaction system. Alternatively, these materials may be mixed together in advance to provide a polymerization catalyst mixture, which is then provided to the polymerization reaction.

More preferably, the aryl fluoride boron compound (B) is mixed with the boron trifluoride compound (A) in advance to produce a polymerization catalyst complex in which the aryl fluoride boron compound (B) is coordinated with the boron trifluoride compound (A), and a polymerization catalyst mixture containing the polymerization catalyst complex is used. This is because it is inferred that the Lewis acidity of the boron trifluoride compound (A) is significantly increased by coordination.

<Chain Transfer Agent>

In the present invention, a chain transfer agent (also called "molecular weight control agent") may be used from the viewpoint of adjusting the polymerization degree. The type of the chain transfer agent is not particularly limited, and examples thereof include carboxylic acid, carboxylic acid anhydride, ester, amide, imide, phenols and an acetal compound. In particular, phenol, 2,6-dimethylphenol, methylal, polyacetal dimethoxide, methoxymethylal, dimethoxymethylal, trimethoxymethylal and oxymethylene di-n-butyl ether are preferably used. Among them, methylal is most preferred. The chain transfer agent can be used, as appropriate, by being diluted with a solvent inactive to the polymerization reaction.

The amount of the chain transfer agent to be added may be suitably determined depending on desired MFR. In general, the amount is adjusted within a range of 0.5% by mass or less, and preferably 0.3% by mass or less relative to the cyclic oligomer in polymerization starting materials. The lower limit of the addition amount is not particularly limited, and it is sufficient when the amount is more than 0% by mass. Note that the chain transfer agent is not necessarily required to be used, and when it is not used, the addition amount is 0% by mass as a matter of course.

In the case where the chain transfer agent is used by being diluted with a solvent inactive to the polymerization reaction, examples of the solvent include: aliphatic hydrocarbons such as hexane, heptane and cyclohexane; aromatic hydrocarbons such as benzene, toluene and xylene; halogenated hydrocarbons such as methylene dichloride and ethylene dichloride; carboxylic acid esters such as methyl formate, ethyl formate and methyl acetate; low-molecular-weight ketones such as acetone, 2-butanone, 2-pentanone and 3-pentanone; and ethers such as 1,2-dimethoxyethane, diethylene glycol dimethyl ether, 1,4-dioxane and n-butyl ether. In particular, from the viewpoint of removal from the oxymethylene polymer produced, a solvent whose boiling point under 1 atmospheric pressure is 115° C. or lower is preferred, though it is not essential in the present invention.

According to the production method of the present invention, by increasing the amount of the chain transfer agent, the amount of production can be further increased while ensuring production stability in the polymerization process. Specifically, according to the production method of the present invention, the chain transfer agent can be increased in an amount of 10 to 40% by mass when compared to the case where the oxymethylene polymer is produced under the same conditions except that the boron trifluoride compound (A) and the aryl fluoride boron compound (B) are not used as polymerization catalysts.

Note that when the amount of the chain transfer agent exceeds a usable amount, a phenomenon in which the value of MFR of the oxymethylene polymer obtained becomes larger than a desired value occurs. By confirming the presence or absence of the phenomenon, the upper limit of the usable amount of the chain transfer agent can be determined. For example, the amount of the chain transfer agent used at the point when the value of MFR becomes larger than 120% of the desired value is judged to be the upper limit of the usable amount. Similarly, when the amount of the chain transfer agent is less than a usable amount, a phenomenon in which the value of MFR of the oxymethylene polymer obtained becomes smaller than a desired value occurs. By confirming the presence or absence of the phenomenon, the lower limit of the usable amount of the chain transfer agent can be determined. For example, the amount of the chain transfer agent used at the point when the value of MFR becomes smaller than 80% of the desired value can be judged to be the lower limit of the usable amount.

<Polymerization Reaction>

In the present invention, the mode of the polymerization reaction is not particularly limited, and a mode similar to that in a conventionally known method for producing an oxymethylene polymer can be employed. Specifically, any of bulk polymerization, suspension polymerization, solution polymerization and melt polymerization may be employed, but bulk polymerization is particularly preferred.

Bulk polymerization is a polymerization method in which a monomer in a molten state is used and substantially no solvent is used. In the case of bulk polymerization, as a polymerization reaction proceeds, a polymerized product is crystallized in a monomer mixture, and eventually, the entire system is bulked and powdered, and a solid polymer is obtained. The polymerization is performed in the absence of oxygen, and preferably under nitrogen atmosphere.

The polymerization machine to be used for the polymerization reaction is not particularly limited. For example, in the case of bulk polymerization, a reaction tank equipped with a stirrer that is generally used in the production of oxymethylene polymers can be used as a batch type, and a continuous polymerization apparatus for trioxane or the like that has been already proposed, such as a co-kneader, a twin screw continuous extrusion mixer and a two-shaft paddle type continuous mixer, can be used as a continuous type. It is also possible to use a plurality of polymerization machines in combination.

Further, the method for feeding or adding raw materials to be used for the polymerization reaction such as the cyclic oligomer, comonomer, polymerization catalysts and chain transfer agent (molecular weight control agent) to the polymerization apparatus is not particularly limited. The above-described raw materials may be combined at an inlet of the polymerization machine and then introduced into the polymerization machine to promote the polymerization reaction. Alternatively, a part of the raw materials may be mixed in advance, followed by combining the mixture with the remaining raw materials at the inlet of the polymerization machine and introducing it into the polymerization machine to promote the polymerization reaction. It is preferred to employ a method in which: a part or all of the raw materials are sufficiently mixed in advance while the liquid phase state is maintained; the obtained mixture of raw materials is fed to the polymerization apparatus; and when there are remaining raw materials, these materials are further fed to perform the polymerization reaction. This is because the amount of the catalysts required for the polymerization reaction can be reduced thereby, and as a result, the amount of generation of formaldehyde from oxymethylene polymer products is reduced.

It is preferred that the aryl fluoride boron compound (B) is mixed with the boron trifluoride compound (A) in advance to be used in the state of a polymerization catalyst mixture.

The polymerization catalyst may be directly added to the reaction system, but the catalyst is preferably added after being diluted with an organic solvent that does not adversely affect the polymerization reaction since the catalyst can be homogeneously dispersed in the reaction system. In the case where the polymerization catalyst is used by being diluted with a solvent inactive to the polymerization reaction, examples of the solvent include: aliphatic hydrocarbons such as hexane, heptane and cyclohexane; aromatic hydrocarbons such as benzene, toluene and xylene; halogenated hydrocarbons such as methylene dichloride and ethylene dichloride; carboxylic acid esters such as methyl formate, ethyl formate and methyl acetate; low-molecular-weight ketones such as acetone, 2-butanone, 2-pentanone and 3-pentanone; and ethers such as 1,2-dimethoxyethane, diethylene glycol dimethyl ether, 1,4-dioxane and n-butyl ether. In particular, from the viewpoint of removal from the oxymethylene polymer produced, a solvent whose boiling point under 1 atmospheric pressure is 115° C. or lower is preferred, though it is not essential in the present invention.

The temperature of the polymerization reaction is not particularly limited, and it is usually 60 to 120° C. The pressure during the polymerization reaction is not particularly limited, but when the atmospheric pressure is 100 kPa, the absolute pressure is preferably 99.0 to 101.00 kPa. The polymerization reaction time (residence time in the polymerization apparatus) is not particularly limited, and it is usually 2 to 30 minutes. When stirring is performed during the polymerization reaction, the rotation speed of a stirring blade is preferably 10 to 100 rpm, and particularly preferably 20 to 60 rpm.

By the polymerization reaction, a crude oxymethylene polymer is obtained. The crude oxymethylene polymer is in a state where unreacted raw materials, etc. are not removed yet. The content rate of the oxymethylene polymer in the crude oxymethylene polymer obtained by the polymerization reaction (hereinafter sometimes referred to as the POM content rate) tends to be high, and it is preferably more than 92%, more preferably 93.5% or more, and particularly preferably 95% or more. The upper limit is not particularly limited and is 100% by mass or less. It is preferred to control polymerization conditions in a manner such that the POM content rate of the crude oxymethylene polymer is within the above-described range. When the POM content rate of the crude oxymethylene polymer is high, it means that the amount of the unreacted monomer is small and that the polymerization reaction has sufficiently proceeded. Accordingly, by increasing the POM content rate of the crude oxymethylene polymer, energy required for recovery of unreacted raw materials can be reduced.

The POM content rate of the crude oxymethylene polymer is measured according to the below-described method. Specifically, a part of the crude oxymethylene polymer obtained by the polymerization reaction is collected, and the weight thereof (hereinafter referred to as Ag) is measured. Next, the crude oxymethylene polymer is washed twice with acetone in order to remove the unreacted monomer, and then acetone and the remaining unreacted monomer are vacuum dried using a vacuum dryer at 60° C. for 2 hours. The weight after vacuum drying (Bg) is measured. The obtained values are applied to the below-described formula to calculate the POM content rate of the crude oxymethylene polymer.

$$\text{POM content rate (\% by weight)} = B(g)/A(g) \times 100$$

<Termination of Polymerization Reaction>

After the polymerization reaction has sufficiently proceeded, as appropriate, a publicly-known terminator may be mixed with the reaction system to deactivate the polymerization catalyst and a polymerization growth end to terminate the polymerization reaction. Examples of the publicly-known terminator include: a trivalent organophosphorous compound such as triphenylphosphine; a hydroxide of an alkali metal; a hydroxide of an alkaline earth metal; and an amine compound such as diethylamine, triethylamine, tributylamine, triethanolamine, N-methyldiethanolamine, N,N-diethylhydroxylamine, N-isopropylhydroxylamine, N,N-bisoctadecylhydroxylamine and N,N-dibenzylhydroxylamine. Among them, N,N-diethylhydroxylamine is particularly preferred because it is easily obtained and has excellent characteristics in which the amount of generation of formaldehyde from products is reduced and a mold deposit is less generated at the time of molding.

The amount of the terminator to be added is not particularly limited as long as it is sufficient for deactivating the catalyst, but the molar ratio thereof to the catalyst is usually $1.0 \times 10^{-1}$ to $1.0 \times 10^{1}$.

When using the terminator in the form of a solution or suspension, a solvent to be used is not particularly limited. Water, alcohols, and various aliphatic or aromatic organic solvents such as acetone, methyl ethyl ketone, hexane, cyclohexane, heptane, benzene, toluene, xylene, methylene dichloride and ethylene dichloride can be used.

The apparatus for adding and mixing the terminator and the timing for the addition are not particularly limited. For example, it is possible to employ a method in which a mixer with a specification similar to that of the above explained polymerization machine, which is connected to the polymerization machine in series, is used and the terminator is added at an inlet of the mixer and then mixed. The temperature at the time of adding and mixing the terminator is not particularly limited, and it is preferably 0 to 160° C., and particularly preferably 0 to 120° C. The pressure is not particularly limited, but when the atmospheric pressure is 100 kPa, the absolute pressure is preferably 99.0 to 101.0 kPa. The mixing time after the addition (residence time in the mixer) is not particularly limited, and it is preferably 1 to 150 minutes, and particularly preferably 1 to 120 minutes.

<Stabilization>

After the polymerization reaction has sufficiently proceeded, a polymerization termination step that is performed as appropriate is completed and a crude polymer is obtained, the crude polymer discharged from the polymerization machine and a publicly-known stabilizer are, as appropriate, blended, and then heated and melt-kneaded using a single screw or twin screw extruder, a twin-paddle type continuous mixer, etc. By doing this, a thermally unstable portion can be thermally decomposed, and the deaeration treatment can be performed under reduced pressure. Such an operation is called stabilization.

The crude polymer may be, as appropriate, pulverized using a turbo mill or the like after discharged from the polymerization machine before heating and melt-kneading (in the case where blending is performed, before blending).

In the case of blending the crude polymer and the stabilizer, blending may be performed according to a publicly-known method. For example, melt-kneading may be performed using the mixer used for mixing the product and the terminator, which is connected to the polymerization machine in series. The apparatus for performing melt-kneading preferably has vent function, and examples thereof include a single-screw or multi-screw continuous kneading extruder and a twin screw surface-renewal type horizontal kneader, which have at least one vent hole. These apparatuses may be used solely, or two or more of them may be used in combination.

In the case where the crude polymer and the stabilizer are not blended in advance, it is preferred to continuously supply the stabilizer to the line of the crude polymer. Alternatively, it is preferred to supply the crude polymer and the stabilizer to a twin screw extruder respectively via different lines, followed by performing heating and melt-kneading in the twin screw extruder.

As the publicly-known stabilizer, for example, an antioxidant such as triethylene glycol-bis[3-(3-t-butyl-4-hydroxy-5-methylphenyl)propionate] {sometimes referred to as ethylenebis(oxyethylene) bis[3-(5-tert-butyl-4-hydroxy-m-tolyl)propionate]}; a thermal stabilizer such as melamine; a formaldehyde scavenger; an acid scavenger; etc. can be used. Moreover, additives including an inorganic filler such as glass fiber, a crystallization promoter (nucleating agent); a mold release agent; a sliding agent; and a coloring agent may be added.

In the stabilization step, from the viewpoint of more effectively suppressing an odor generated at the time of molding and an odor generated from a molded body, it is preferred to use a layered double hydroxide such as hydrotalcite instead of the publicly-known stabilizer or together with the publicly-known stabilizer.

The amount of the layered double hydroxide to be added may be suitably determined, and it is preferably 0.003 to 1 part by mass, more preferably 0.003 to 0.6 part by mass, 0.004 to 0.6 part by mass or 0.005 to 0.5 part by mass, even more preferably 0.005 to 0.2 part by mass, and particularly preferably 0.01 to 0.2 part by mass per 100 parts by mass of the oxymethylene polymer.

As in the case of the stabilizer, the layered double hydroxide may be heated and melt-kneaded after being blended in the crude polymer, or may be continuously supplied to the line of the crude polymer, or may be continuously supplied to a twin screw extruder via a line different from that of the crude polymer. The layered double hydroxide and the publicly-known stabilizer may be added either simultaneously or separately.

The temperature for performing melt-kneading is not particularly limited as long as it is equal to or higher than the melting point of the product obtained by the polymerization reaction, and it is preferably 170° C. to 270° C., and more preferably 190° C. to 250° C. When the temperature for melt-kneading is 270° C. or lower, decomposition and deterioration of the product and the oxymethylene polymer obtained by melt-kneading are not easily caused during melt-kneading.

The pressure for performing melt-kneading is not particularly limited, but melt-kneading is preferably performed together with the deaeration treatment under reduced pressure in order to remove the cyclic oligomer as the unreacted raw material, a formaldehyde component derived from the cyclic oligomer, formaldehyde derived from a hemiformal end, etc. Deaeration under reduced pressure is performed from the above-described vent hole. Accordingly, regarding the pressure for melt-kneading, when the atmospheric pressure is 100 kPa, the absolute pressure is preferably 10 to 100 kPa, more preferably 10 to 70 kPa, and particularly preferably 10 to 50 kPa. The rotation speed of the stirring blade at the time of melt-kneading is preferably 50 to 200 rpm in the case of the twin screw extruder, and 1 to 100 rpm in the case of the twin screw surface-renewal type horizontal kneader.

The time for performing melt-kneading (residence time in the melt-kneading apparatus) is not particularly limited, and it is preferably 1 to 60 minutes, and particularly preferably 1 to 40 minutes.

In this way, the oxymethylene polymer as the target substance is obtained.

The above-described production process is just an example. Another step may be suitably added, and any step may be suitably omitted. The details of each step may be changed. For example, after termination of the polymerization reaction and before stabilization, washing the crude polymer, separation/recovery of the unreacted monomer, drying, etc. may be carried out as appropriate. Further, when purification is required, washing, separation/recovery of the unreacted monomer, drying, etc. may be carried out after stabilization.

Further, other than the above-described materials, materials including publicly-known additives may be used within a range in which the purpose of the present invention is not impaired. Moreover, the above-described materials may be used in a step different from the above-described steps within a range in which the purpose of the present invention is not impaired. For example, an antioxidant and a heat-resistant stabilizer, which can be used in the stabilization step, may be used in the polymerization termination step.

<Oxymethylene Polymer>

The oxymethylene polymer obtained by the production method of the present invention is a high-molecular-weight compound, which usually contains an oxymethylene group ($—OCH_2—$) as a structural unit, and in the case of a copolymer, further contains a group derived from the comonomer such as an oxyalkylene group having 2 or more carbon atoms as a structural unit. The oxyalkylene group having 2 or more carbon atoms is not particularly limited, and examples thereof include an oxyethylene ($—OCH_2CH_2—$) group, an oxypropylene ($—OCH_2CH_2CH_2—$) group and an oxybutylene ($—OCH_2CH_2CH_2CH_2—$) group. Among them, the oxyethylene group ($—OCH_2CH_2—$) is particularly preferred as the oxyalkylene group having 2 or more carbon atoms.

The content of the oxyalkylene group having 2 or more carbon atoms contained in the oxymethylene polymer is not particularly limited, and it is preferably 0.4 mol to 15 mol, more preferably 0.4 mol to 10 mol, and particularly preferably 0.4 mol to 5.0 mol relative to 100 mol of the total of the molar quantity of the oxymethylene group and the molar quantity of the oxyalkylene group.

The content of the oxyalkylene group having 2 or more carbon atoms in the oxymethylene polymer can be measured by 1H-NMR as shown in the Examples below.

The oxymethylene polymer obtained by the production method of the present invention can exist together with at least the above-described boron trifluoride compound (A) and the above-described aryl fluoride boron compound (B). Further, in some cases, the oxymethylene polymer can exist together with an optional component added within a range in which the purpose of the present invention is not impaired. Accordingly, the oxymethylene polymer of the present invention can exist in the state of an oxymethylene polymer composition.

<Oxymethylene Polymer Resin Composition>

Another embodiment of the present invention relates to an oxymethylene polymer resin composition which contains the oxymethylene polymer and a derivative of the aryl fluoride boron compound (hereinafter sometimes referred to as "the oxymethylene polymer resin composition of the present invention").

Preferably, the oxymethylene polymer is an oxymethylene copolymer containing an oxymethylene unit and an oxyalkylene unit having 2 or more carbon atoms.

The oxymethylene polymer resin composition of the present invention can be produced according to any method using the aryl fluoride boron compound and the boron trifluoride compound, but preferably, the composition is produced according to the production method of the present invention. Further, the composition is preferably produced using a polymerization catalyst mixture obtained by mixing the aryl fluoride boron compound and the boron trifluoride compound in advance, and the composition is more preferably produced according to the production method of the present invention using the polymerization catalyst mixture obtained by mixing the aryl fluoride boron compound and the boron trifluoride compound in advance. The details of the definitions, types, purposes of blending, etc. of the aryl fluoride boron compound and the boron trifluoride compound are as described in the item regarding the polymerization catalyst in the description regarding the production method of the present invention.

The details of the oxymethylene polymer are as described in the item regarding the oxymethylene polymer.

Derivative of Aryl Fluoride Boron Compound

In the oxymethylene polymer resin composition of the present invention, the aryl fluoride boron compound is contained in a state where a derivative thereof is formed with another component.

For example, when the oxymethylene polymer resin composition of the present invention is produced using the aryl fluoride boron compound and another material containing fluorine, the composition of the present invention contains a fluorine adduct of the aryl fluoride boron compound as a derivative of the aryl fluoride boron compound.

Preferably, by producing the oxymethylene polymer resin composition of the present invention using the polymerization catalyst mixture obtained by mixing the aryl fluoride boron compound and the boron trifluoride compound in advance, a fluorine adduct of the aryl fluoride boron compound derived from the aryl fluoride boron compound and the boron trifluoride compound is contained in the composition of the present invention. In this case, from the viewpoint of achieving a balance between obtaining a high molecular weight product and obtaining a high yield in the production process and suppressing increase in an odor related to molding (odor generated from molded bodies), the molar ratio of the amount of boron derived from the aryl fluoride boron compound (B1) to the amount of boron derived from the boron trifluoride compound (B2) (B1/B2) is preferably 0.0001 to 0.1.

The amount of boron derived from the boron trifluoride compound (B2) and the amount of boron derived from the aryl fluoride boron compound (B1) can be measured by the methods shown in the below-described Examples. Specifically, the amount of boron derived from the aryl fluoride boron compound (B1) can be obtained by obtaining the content of the derivative of the aryl fluoride boron compound by means of LC-MS analysis and calculating the amount of boron. Further, the amount of boron derived from the boron trifluoride compound (B2) can be obtained by measuring the total boron amount (B3) in the oxymethylene copolymer resin composition of the present invention using a ICP emission spectrophotometer and obtaining the difference between the total boron amount (B3) and the amount of boron derived from the aryl fluoride boron compound (B1).

In the oxymethylene polymer resin composition of the present invention, preferably, the aryl fluoride boron compound is at least one selected from the group consisting of tris(pentafluorophenyl)borane, bis(pentafluorophenyl)fluoroborane and pentafluorophenyldifluoroborane, and hydrates thereof.

The oxymethylene polymer resin composition of the present invention may contain other components in addition to the oxymethylene polymer and the derivative of the aryl fluoride boron compound. Examples of said other components include the other materials in the description regarding the production method of the present invention or components derived therefrom. For example, the oxymethylene polymer resin composition of the present invention may contain a layered double hydroxide such as hydrotalcite, an antioxidant, a nitrogen-containing compound such as melamine, etc.

<Intended Use of Oxymethylene Polymer>

The oxymethylene polymer obtained by the production method of the present invention or the oxymethylene copolymer resin composition of the present invention can be molded into various forms according to a publicly-known method for molding an oxymethylene polymer. Examples of forms of molded bodies made of the oxymethylene polymer of the present invention or the oxymethylene copolymer resin composition of the present invention include, but are not limited to, a pellet, a round bar, a thick plate, a sheet, a tube, a cylindrical container and a square container.

The oxymethylene polymer of the present invention and the molded body thereof can be used for various parts of machines, electricity, automobiles, building materials, etc., which are conventionally known as intended uses of oxymethylene polymers. For example, these can be used for automobile parts, clothing parts, electrical and electronic molded parts and molded parts for information recording devices, molded parts for medical devices, domestic molded parts, rotary parts such as gears, bearing members, sliding members, press-fit parts, hinge parts, parts related to automotive fuel, insert parts, snap-fit parts, water-related parts, various handles, various handrails, various chassis, side plate parts, spring parts, seat belt parts, automobile carrier plates, automobile combination switches, clips, pipe holders, electric wire holders, connectors, assist clips, housing materials for bumpers, console boxes, door trims, door checkers, ball joints, undercut parts, housing cases of optical fiber core connection portions, disk cartridges, tape cassettes, trays for disk-shaped recording media, toners, film holders, protective covers, artificial joints, valves for inserting medical tools, blood vessel insertion tools, caps, compact containers, fastener parts, card cases, tooth brushes, food and drink utensils, curtain rails with covers, curtain rail caps, lids for liquid containers, writing tools, foldable storage frames, baskets and handles thereof, etc.

EXAMPLES

Hereinafter, the present invention will be described in more detail by way of working examples. However, the present invention is not limited to the below-described examples.

Examples 1-4

A batch polymerization reaction was performed using a batch reactor (manufactured by Irie Shokai Co., Ltd., PNV-5). In this batch reactor, a biaxial Σ type stirring blade was provided to the inside of a reactor with an effective volume of 3 L having a jacket structure. The jacket temperature was set at 65° C.

1200 g of trioxane, 48 g of 1,3-dioxolane as a comonomer, and methylal as a chain transfer agent (benzene solution in which the concentration of methylal was 50% by mass) in an amount of 400 ppm relative to trioxane were put into the batch reactor sufficiently dried. Next, a polymerization catalyst mixture obtained by mixing $BF_3$ and tris(pentafluorophenyl)borane (TPB) in amounts described in Table 1 below with a benzene solution was injected while stirring and mixing the content by rotating the stirring blade at 60 rpm, and to start a polymerization reaction.

15 minutes after the addition of the polymerization catalyst mixture, N,N-diethylhydroxylamine (benzene solution in which the concentration of N,N-diethylhydroxylamine was 20% by weight) was added in an amount of 4 mol relative to 1 mol of the polymerization catalyst (total of $BF_3$ and TPB), and stirring was further continued for 5 minutes to deactivate the polymerization catalyst. After that, stirring of the batch reactor was stopped to take out a coarsely pulverized polymer (crude oxymethylene copolymer).

A part of the obtained crude oxymethylene copolymer was used for evaluation of the POM content rate described later.

The remaining part of the crude oxymethylene copolymer was pulverized using a pulverizer. The obtained pulverized product of the crude oxymethylene copolymer, triethyleneglycol-bis[3-(3-t-butyl-4-hydroxy-5-methylphenyl)propionate]{ethylenebis(oxyethylene)bis[3-(5-tert-butyl-4-hydroxy-m-tolyl)propionate]}(IRGANOX (registered trademark) 245, manufactured by BASF) as an antioxidant, and melamine (manufactured by Mitsui Chemicals, Inc.) as a thermal stabilizer were melt-kneaded under nitrogen atmosphere for 20 minutes at 30 rpm using a twin screw kneader (manufactured by Toyo Seiki Seisaku-sho, Ltd., Labo Plastomill, 4C-150) with its temperature being set at 220° C. In this regard, 0.3 part by mass of triethylene glycol-bis[3-(3-t-butyl-4-hydroxy-5-methylphenyl)propionate] {ethylenebis(oxyethylene) bis[3-(5-tert-butyl-4-hydroxy-m-tolyl)propionate]} and 0.1 part by mass of melamine were used relative to 100 parts by mass of the crude oxymethylene copolymer.

In this way, the oxymethylene copolymer was obtained as the final sample.

Comparative Examples 1-2

An oxymethylene copolymer was obtained in a manner similar to that in Examples 1-4, except that only $BF_3$ in an amount described in Table 1 below was injected without use of TPB instead of injecting both $BF_3$ and TPB in amounts described in Table 1.

In Comparative Example 2 in which only $BF_3$ was used, the value of MFR was large and obtaining a high molecular weight product was not sufficiently carried out. Further, the POM content rate of the crude oxymethylene copolymer was low and the polymerization reaction was not sufficiently performed. When the amount of $BF_3$ of Comparative Example 1 was increased from that of Comparative Example 2, the POM content rate of the crude oxymethylene copolymer was improved, but the value of MFR was also increased and reduction in the molecular weight was promoted. In addition, the amount of generation of formaldehyde was also increased, resulting in deterioration of an odor.

Comparative Examples 3-4

An oxymethylene copolymer was obtained in a manner similar to that in Examples 1-4, except that only TPB in an amount described in Table 1 below was injected without use of $BF_3$ instead of injecting both $BF_3$ and TPB in amounts described in Table 1.

In Comparative Example 3, $BF_3$ was not used and only TPB was used as the polymerization catalyst in the same amount as that in Example 3. As a result, the polymerization reaction did not proceed. In Comparative Example 4, $BF_3$ was not used and only TPB was used in the double amount as the polymerization catalyst. As a result, the polymerization reaction proceeded rapidly and the polymerization machine stopped due to overload. For this reason, the polymerization was discontinued. Thus, when TPB was used solely, it was difficult to control the polymerization reaction.

Examples 5-6

Trioxane and 1,3-dioxolane were joined to obtain a mixed fluid. In this regard, trioxane was joined at a rate of 200 kg/hr, and 1,3-dioxolane as a comonomer was joined at a rate of 8.0 kg/hr. Next, with the mixed fluid, methylal as a chain transfer agent (benzene solution in which the concentration of methylal was 33% by mass) was joined with its amount being adjusted in a manner such that MFR became 8 g/10 min. Finally, as a polymerization catalyst, $BF_3$ and TPB were continuously joined in amounts described in Table 2 to obtain a mixture. Immediately after that, the mixture was fed to a biaxial continuous polymerization machine having a self-cleaning type paddle with its temperature being set at 85° C.

A polymerization reaction was continuously performed in a manner such that the residence time of a polymerization reaction product in the continuous polymerization machine was 15 minutes, thereby obtaining the polymerization reaction product.

When the residence time in the continuous polymerization machine reached 15 minutes, N,N-diethylhydroxylamine as a polymerization terminator (benzene solution in which the concentration of N,N-diethylhydroxylamine was 20% by weight) was put into the continuous polymerization machine. The addition amount was 4 mol per 1 mol of the polymerization catalyst. After the addition, pulverization was carried out to obtain a crude oxymethylene copolymer.

The crude oxymethylene copolymer, triethylene glycol-bis[3-(3-t-butyl-4-hydroxy-5-methylphenyl)propionate] {ethylenebis(oxyethylene) bis[3-(5-tert-butyl-4-hydroxy-m-tolyl)propionate]} (IRGANOX (registered trademark) 245, manufactured by BASF) as an antioxidant, and melamine (manufactured by Mitsui Chemicals, Inc.) as a thermal stabilizer were added, and the mixture was premixed using a Henschel mixer. Relative to 100 parts by mass of the crude oxymethylene copolymer, 0.3 part by mass of triethylene glycol-bis[3-(3-t-butyl-4-hydroxy-5-methylphenyl)propionate]{ethylenebis(oxyethylene) bis[3-(5-tert-butyl-4-hydroxy-m-tolyl)propionate]} and 0.1 part by mass of melamine were added.

The crude oxymethylene copolymer after premixing was introduced into a co-rotating twin screw extruder (inner diameter: 69 mm, L/D=31.5) from a hopper having an automatic quantitative feeder function at a rate of 60 kg/hr, and the crude oxymethylene copolymer was melted at 220 to 230° C. and continuously introduced into a twin screw surface-renewal type horizontal kneader.

The height of the solution level was controlled in a manner such that the residence time of the oxymethylene copolymer in the twin screw surface-renewal type horizontal reactor (effective inner volume: 60 L, which is a volume obtained by subtracting the volume occupied by stirring blades from the total inner volume) became 24 minutes. While devolatilization was performed under a reduced pressure of 21.3 kPa at 220° C., the melted oxymethylene copolymer was continuously drawn out using a gear pump.

A strand of the melted resin continuously drawn out using the gear pump was immersed in a water bath for cooling and then fed to a pelletizer to be pelletized. The obtained pellet was dried by a hot-air dryer at 120° C. for 12 hours to obtain a final sample.

Comparative Example 5

An oxymethylene copolymer was obtained in a manner similar to that in Examples 5-6, except that only $BF_3$ in an amount described in Table 2 below was fed without use of TPB instead of feeding both $BF_3$ and TPB in amounts described in Table 2.

<MFR>

MFR of each oxymethylene copolymer (final sample) obtained in the Examples and Comparative Examples was measured according to ASTM-D1238 (190° C., under a weight of 2.16 kg). The results are shown in Tables 1 and 2.

When the value of MFR is small, it means that the molecular weight is large.

<POM Content Rate of Crude Oxymethylene Copolymer>

A part of each crude oxymethylene copolymer obtained in the polymerization reaction step in the Examples and Comparative Examples was recovered, and the weight thereof (hereinafter referred to as Ag) was measured. Next, the crude oxymethylene copolymer was washed twice with acetone in order to remove the unreacted monomer, and then acetone and the remaining unreacted monomer were vacuum dried using a vacuum dryer at 60° C. for 2 hours. The weight after vacuum drying (Bg) was measured. The POM content rate of the crude oxymethylene copolymer was calculated according to the below-described formula:

POM content rate (% by weight)=$B(g)/A(g)$×100

The results are shown in Tables 1 and 2.

When the POM content rate of the crude oxymethylene copolymer is low, it means that the amount of the unreacted monomer is large and that the polymerization reaction has not sufficiently proceeded.

<Amount of Generation of Formaldehyde>

In order to evaluate the amount of formaldehyde (HCHO) generated from the oxymethylene copolymer, each final sample obtained in Examples 1-4 and Comparative Examples 1-4 was frozen using liquid nitrogen and pulverized using a sample mill. Powder which was passed through a sieve with an opening of 250 μm (60 mesh) and remained on a sieve with an opening of 125 μm (120 mesh) was vacuum dried at 60° C. for 2 hours to obtain an evaluation sample. 0.1 g of the evaluation sample was precisely weighed, and the amount (mg/kg-POM) of formaldehyde generated from the evaluation sample during the heat treatment at 160° C. for 2 hours was obtained by means of headspace gas chromatography using a gas chromatograph (GC-2010plus manufactured by Shimadzu Corporation) according to the headspace method. The results are shown in Table 1.

When the amount of generation of formaldehyde is large, it means that a large amount of formaldehyde remains in a product. When a large amount of formaldehyde remains in a product, it leads to the generation of an odor at the time of injection molding, extrusion molding or the like, and it also leads to increase in the amount of formaldehyde generated from a final molded product. Further, it is suggested that the larger the amount of generation of formaldehyde is, the more insufficient the removal of unstable end portions in the stabilization step is and the more insufficient the deactivation of the polymerization catalyst is. Accordingly, it is preferred that the amount of generation of formaldehyde is smaller.

<Yield>

The yield of each crude oxymethylene copolymer obtained in Examples 5-6 and Comparative Example 5 was calculated according to the below-described formula:

Yield (%)=(a yield per hour (kg/hr) of crude oxymethylene copolymer discharged after the pulverization step)×(POM content rate (% by weight) of crude oxymethylene copolymer)/(total amount of monomer fed per hour (kg/hr))

As is understood from the above-described formula, the yield indicates the ratio of the oxymethylene copolymer produced per the total amount of the monomer fed, and is a parameter different from the POM content rate that indicates the ratio of the oxymethylene copolymer in the crude oxymethylene copolymer.

The results are shown in Table 2.

<Odor Related to Molding>

In order to evaluate the strength of an odor related to molding, a molded body was obtained from a pellet of each oxymethylene copolymer obtained as the final product in Examples 5-6 and Comparative Example 5. Further, the amount of generation of formaldehyde (HCHO) from the obtained molded body (unit: mg/1 kg of the pellet) was measured by the below-described procedure. The results are shown in Table 2.

1) The pellet of the oxymethylene copolymer obtained as the final product was preliminarily dried at 80° C. for 3 hours. After that, it was molded into a disk test piece having a diameter of 50 mm and a thickness of 3 mm using a molding machine SAV-30-30 manufactured by Sanjo at a cylinder temperature of 230° C.

2) On the day after the day on which molding was performed, using the obtained test piece, the amount of generation of formaldehyde was measured in accordance with the method described in Standard VDA275 of the German Automobile Industry Association (Automotive interior parts-Determination of the amount of formaldehyde emission by the revised flask method).

TABLE 1

|  | Polymerization catalyst | | | Chain transfer agent | | POM content | Amount of generation of |
| --- | --- | --- | --- | --- | --- | --- | --- |
|  | $BF_3$ mmol/mol-TOX | TPB mmol/mol-TOX | $TPB/BF_3$ Molar ratio | Methylal ppm | MFR g/10 min | rate % | HCHO mg/kg-POM |
| Example 1 | 0.030 | 0.0001 | 0.0033 | 400 | 6.4 | 96.1 | 398 |
| Example 2 | 0.030 | 0.0002 | 0.0067 | 400 | 5.5 | 97.6 | 323 |
| Example 3 | 0.020 | 0.0010 | 0.050 | 400 | 6.8 | 98.2 | 390 |
| Example 4 | 0.015 | 0.0002 | 0.013 | 400 | 4.6 | 95.0 | 280 |
| Comparative Example 1 | 0.045 | 0 | Only $BF_3$ | 400 | 14.9 | 98.0 | 529 |
| Comparative Example 2 | 0.030 | 0 | Only $BF_3$ | 400 | 8.9 | 92.0 | 396 |
| Comparative Example 3 | 0 | 0.0010 | Only TPB | 400 | — | Not polymerized | — |
| Comparative Example 4 | 0 | 0.0020 | Only TPB | 400 | >100 | Polymerization was discontinued | — |

TABLE 2

| | Polymerization catalyst | | | Chain transfer agent | | POM content | | Odor related to molding |
|---|---|---|---|---|---|---|---|---|
| | $BF_3$ mmol/mol-TOX | TPB mmol/mol-TOX | $TPB/BF_3$ Molar ratio | Methylal ppm | MFR g/10 min | rate % | Yield % | (VDA275) mg/kg-POM |
| Example 5 | 0.030 | 0.00015 | 0.0050 | 420 | 8.0 | 96.5 | 76 | 11.4 |
| Example 6 | 0.030 | 0.00030 | 0.010 | 520 | 8.0 | 99.1 | 80 | 10.6 |
| Comparative Example 5 | 0.030 | 0 | Only $BF_3$ | 385 | 8.0 | 93.1 | 75 | 12.1 |

As described above, the present inventors produced oxymethylene copolymers by means of batch polymerization in Examples 1-4 and Comparative Examples 1-4. Further, in Examples 5-6 and Comparative Example 5, the present inventors produced oxymethylene copolymers by means of continuous polymerization which is performed in actual manufacturing. The present inventors compared Examples 1-4 and Comparative Examples 1-4 related to batch polymerization to make consideration. Further, the present inventors compared Examples 5-6 and Comparative Example 5 related to continuous polymerization to make consideration. The contents of consideration are as described below. Note that comparison between batch polymerization and continuous polymerization is not made because production conditions thereof such as scales and apparatuses are different from each other.

Examples 1-4 and Comparative Examples 1-4 in which batch polymerization was performed were compared to each other.

When Examples 1-2 and Comparative Example 2 in which $BF_3$ was used in the same amount were compared, the value of MFR of the finally obtained oxymethylene copolymer was smaller and the POM content rate of the crude oxymethylene copolymer was higher in Examples 1-2, in which TPB was used in addition to $BF_3$, when compared to Comparative Example 2, in which TPB was not used. Further, in Examples 1-2, the amount of generation of formaldehyde was equal to or smaller than that of Comparative Example 2. That is, in Examples 1-2, the POM content rate of the crude oxymethylene copolymer was improved and a molecular weight became high while increase in the amount of generation of formaldehyde was suppressed. It was understood from the aforementioned matter that, by combining $BF_3$ with TPB, MFR is reduced to realize obtaining a high molecular weight product, the POM content rate of the crude oxymethylene copolymer is increased to improve a conversion rate, and increase in the amount of formaldehyde in the oxymethylene copolymer is suppressed.

When Examples 1 and 2 were compared, Example 2, in which the amount of TPB was larger, was more excellent with respect to any of the improvement of the POM content rate and heights of molecular weight and suppression of increase in the amount of generation of HCHO.

When Examples 2-3 and Comparative Example 1, in which the POM content rate of the crude oxymethylene copolymer was at the same level (about 98%), were compared, MFR was lower and a high molecular weight was obtained in the oxymethylene copolymers of Examples 2-3, in which $BF_3$ and TPB were used in combination, when compared to the oxymethylene copolymer of Comparative Example 1, in which TPB was not used. In addition, increase in the amount of generation of HCHO was sufficiently suppressed. The reason thereof is not known exactly, but the present inventors infer that the matter that not only the main reaction, but also a side reaction were activated because in Comparative Example 1, $BF_3$ in the amount larger than those of Examples 2-3 was required to be used instead of not using TPB, and the matter that decomposition of the oxymethylene copolymer was promoted because a relatively large amount of a catalyst-derived material after deactivation remained in the oxymethylene copolymer, led to the above-described results.

Examples 5-6 and Comparative Example 5 in which continuous polymerization was performed were compared to each other.

In Examples 5-6 and Comparative Example 5, $BF_3$ was used in the same amount, but the amount of TPB and the amount of methylal which is a chain transfer agent were changed to provide the same MFR value. When Examples 5-6 and Comparative Example 5 were compared, the POM content rate of the crude oxymethylene copolymer and the yield were higher, and in addition, generation of an odor related to molding was suppressed in Examples 5-6, in which TPB was used in addition to $BF_3$, when compared to Comparative Example 5, in which TPB was not used. It was understood from the aforementioned matter that, by combining $BF_3$ with TPB, the POM content rate of the crude oxymethylene copolymer is increased to improve a conversion rate, the yield is improved, and generation of an odor related to molding can be suppressed.

Overall, the results of Examples 5-6 and Comparative Example 5 show that by using $BF_3$ and TPB in combination, use of a large amount of a chain transfer agent is enabled, and the POM content rate of the crude oxymethylene copolymer and the yield can be improved. Moreover, generation of an odor related to molding from the finally obtained oxymethylene copolymer is suppressed.

In general, when the amount of production in the polymerization process is tried to be increased in the same production apparatus, the speed of heat removal becomes lower than the speed of increase in reaction heat during polymerization. As a result, a side reaction easily proceeds, the polymerization degree is not easily increased and MFR of products is increased, and for this reason, the amount of a chain transfer agent to be used must be decreased. In this regard, when the amount of the chain transfer agent to be used is nearly equal to zero, further increase in the amount of production can no longer be expected, and in addition, the polymerization degree of products cannot be regulated.

According to the present invention, the amount of the chain transfer agent can be increased, and it is extremely advantageous in terms of production stability at the time of further increase in the amount of production.

Example 7

Polymerization Reaction

Trioxane and 1,3-dioxolane were joined to obtain a mixed fluid. In this regard, trioxane was joined at a rate of 200 kg/hr, and 1,3-dioxolane as a comonomer was joined at a rate of 8.0 kg/br. Next, to the mixed fluid, methylal as a chain transfer agent (benzene solution in which the concentration of methylal was 33% by mass) was joined with its amount being adjusted in a manner such that MFR became 8 g/10 min. Finally, as a polymerization catalyst, a polymerization catalyst mixture obtained by mixing boron trifluoride diethyl etherate ($BF_3$) and tris(pentafluorophenyl)borane trihydrate (TPB) in amounts described in Table 3 in advance was continuously joined to obtain a mixture. Immediately after that, the mixture was fed to a biaxial continuous polymerization machine having a self-cleaning type paddle with its temperature being set at 85° C.

A polymerization reaction was continuously performed in a manner such that the residence time in the continuous polymerization machine was 15 minutes.

Termination of Polymerization Reaction

When the residence time reached 15 minutes, N,N-diethylhydroxylamine as a polymerization terminator (benzene solution in which the concentration of N,N-diethylhydroxylamine was 20% by weight) was put into the continuous polymerization machine. The addition amount was 4 mol per 1 mol of the polymerization catalyst ($BF_3$ and TPB). After the addition, pulverization was carried out.

Stabilization

The pulverized product (crude oxymethylene copolymer), triethylene glycol-bis[3-(3-t-butyl-4-hydroxy-5-methylphenyl)propionate] (product name: IRGANOX (registered trademark) 245, manufactured by BASF) as a hindered phenol-based antioxidant, hydrotalcite (product name: Hycite (registered trademark) 713, manufactured by Clariant Chemicals) as a layered double hydroxide, and melamine (manufactured by Mitsui Chemicals, Inc.) as a nitrogen-containing compound were added, and premixed using a Henschel mixer. Relative to 100 parts by mass of the oxymethylene copolymer, the hindered phenol-based antioxidant, hydrotalcite and melamine were added in amounts shown in Table 3.

The premixed product was fed to a hopper and introduced into a co-rotating twin screw extruder (inner diameter: 30 mm, L/D=25) by a screw feeder at a rate of 3 kg/hr. A melted product was continuously extruded while devolatilization was performed under a reduced pressure of 21.3 kPa at a cylinder temperature of 240° C. and at a screw rotation speed of 100 rpm. In this regard, the temperature of the melted resin was about 250° C.

Pelletization

A strand of the melted resin continuously extruded was immersed in a water bath for cooling and then fed to a pelletizer to be pelletized. The obtained pellet was dried by a hot-air dryer at 140° C. for 3 hours.

The pellet was fed to the hopper again and introduced into the co-rotating twin screw extruder (inner diameter: 30 mm, L/D25) by the screw feeder at a rate of 10 kg/hr. A melted product was continuously extruded while devolatilization was performed under a reduced pressure of 21.3 kPa at a cylinder temperature of 200° C. and at a screw rotation speed of 120 rpm. In this regard, the temperature of the melted resin was about 215° C.

A strand of the melted resin continuously extruded was immersed in the water bath for cooling and then fed to the pelletizer to be pelletized. The obtained pellet was dried by the hot-air dryer at 120° C. for 12 hours. This pellet was used as a final sample.

Yield

The yield was calculated in a manner similar to that for the crude oxymethylene copolymers obtained in Examples 5-6 and Comparative Example 5. The results are shown in Table 3.

MFR

MFR of the obtained final sample was measured in a manner similar to that for the final samples obtained in Examples 1-5 and Comparative Examples 1-5. The results are shown in Table 3.

Amount of Generation of HCHO (Initial)

The amount of generation of formaldehyde (HCHO) from a molded body obtained by using the pellet of the final sample (unit: mg/kg) was measured by the below-described procedure.

1) The pellet of the final sample was preliminarily dried at 80° C. for 3 hours. After that, it was molded into a disk test piece having a diameter of 50 mm and a thickness of 3 mm using a molding machine SAV-30-30 manufactured by Sanjo at a cylinder temperature of 230° C.

2) The obtained test piece was allowed to stand overnight in a constant temperature and humidity room at 23° C. and 50±5% RH.

3) On the next day, the amount of generation of formaldehyde from the test piece was measured in accordance with the method described in Standard VDA275 of the German Automobile Industry Association (Automotive interior parts-Determination of the amount of formaldehyde emission by the revised flask method).

Amount of Generation of HCHO (Humidified)

The amount of generation of formaldehyde (HCHO) from a molded body obtained by using the pellet of the final sample after stored under humidified conditions (unit: mg/kg) was measured by the below-described procedure.

1) The pellet of the final sample was stored under an environment at 80° C. and 98% RH for 24 hours and then preliminarily dried at 80° C. for 4 hours. After that, it was molded into a disk test piece having a diameter of 50 mm and a thickness of 3 mm using a molding machine SAV-30-30 manufactured by Sanjo at a cylinder temperature of 230° C.

2) The obtained test piece was allowed to stand overnight in a constant temperature and humidity room at 23° C. and 50±5% RH.

3) On the next day, the amount of generation of formaldehyde from the test piece was measured in accordance with the method described in Standard VDA275 of the German Automobile Industry Association (Automotive interior parts-Determination of the amount of formaldehyde emission by the revised flask method).

TABLE 3

| | | | Example 7 |
|---|---|---|---|
| Polymerization catalyst | BF3 | mmol/mol-TOX | 0.03 |
| | TPB | mmol/mol-TOX | 0.0003 |
| Additive | Antioxidant | phr | 0.3 |
| | Hydrotalcite | phr | 0.01 |
| | Melamine | phr | 0.05 |
| Yield | Product/Total monomer | % | 81 |
| MFR | 190° C., 2.16 kg | g/10 min | 8.7 |
| Amount of generation of HCHO | Initial | mg/kg-POM | 10.3 |
| | Humidified | mg/kg-POM | 9.4 |
| | Difference (Humidified − Initial) | mg/kg-POM | −1.0 |

Component Analysis

Analysis of components in the final sample was carried out. Specifically, the procedure and results are as described below.

(Oxymethylene Unit and Oxyalkylene Unit Having 2 or More Carbon Atoms)

The oxyalkylene unit contained in the final sample was quantified by analysis by means of proton nuclear magnetic resonance (1H-NMR). The specific method was as described below.

For the preparation of the oxymethylene copolymer in the Examples, 1,3,5-trioxane was used as the principal monomer and 1,3-dioxolane was used as the comonomer. Therefore, as the oxyalkylene unit having 2 or more carbon atoms, an oxyethylene unit was a target to be quantified.

The final sample was cooled to have a temperature equal to or lower than the glass transition temperature using liquid nitrogen and pulverized by a mill to obtain a pulverized product. The pulverized product was sieved to collect powder. Said powder was weighed and dissolved in 1,1,1,3,3,3-hexafluoroisopropanol-D2 (purity: 99%). The obtained solution was subjected to 1H-NMR analysis.

Identification and quantitation were carried out using AVANCE III 500 manufactured by BRUKER as an NMR apparatus.

The results are shown in FIG. 1. Regarding the results of quantitation, relative to 100 mol of the total of the oxymethylene unit and the oxyethylene unit, the oxymethylene unit was 98.7 mol and the oxyethylene unit was 1.3 mol.

(Derivative of Aryl Fluoride Boron Compound)

The derivative of the aryl fluoride boron compound in the final sample was quantified by liquid chromatography-electrospray ionization mass spectrometry (LC-MS (ESI–)).

Figure 2:
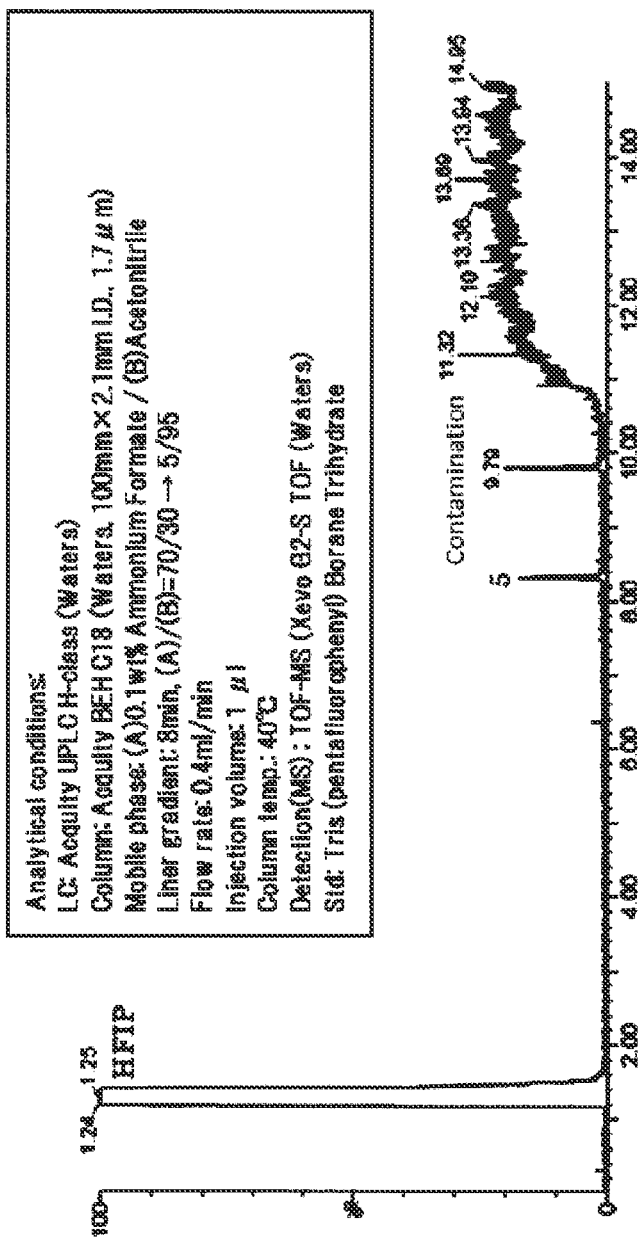
FIG. 2 shows a mass chromatogram of the sample obtained in Example 7.

To the final sample, hexafluoroisopropanol was added to completely dissolve the sample to obtain a solution A. Methanol was weighed and put into a vial, and the solution A was added dropwise thereto to precipitate resin. The total amount of a soluble part was recovered, and methanol was added thereto to be subjected to LC-MS (ESI–) analysis. The measurement results are shown in FIG. 2.

Since the final sample was the oxymethylene copolymer obtained by using tris(pentafluorophenyl)borane trihydrate as aryl fluoride boron, when it was subjected to the analysis, a fluorine adduct of tris(pentafluorophenyl)borane was detected.

Figure 3:
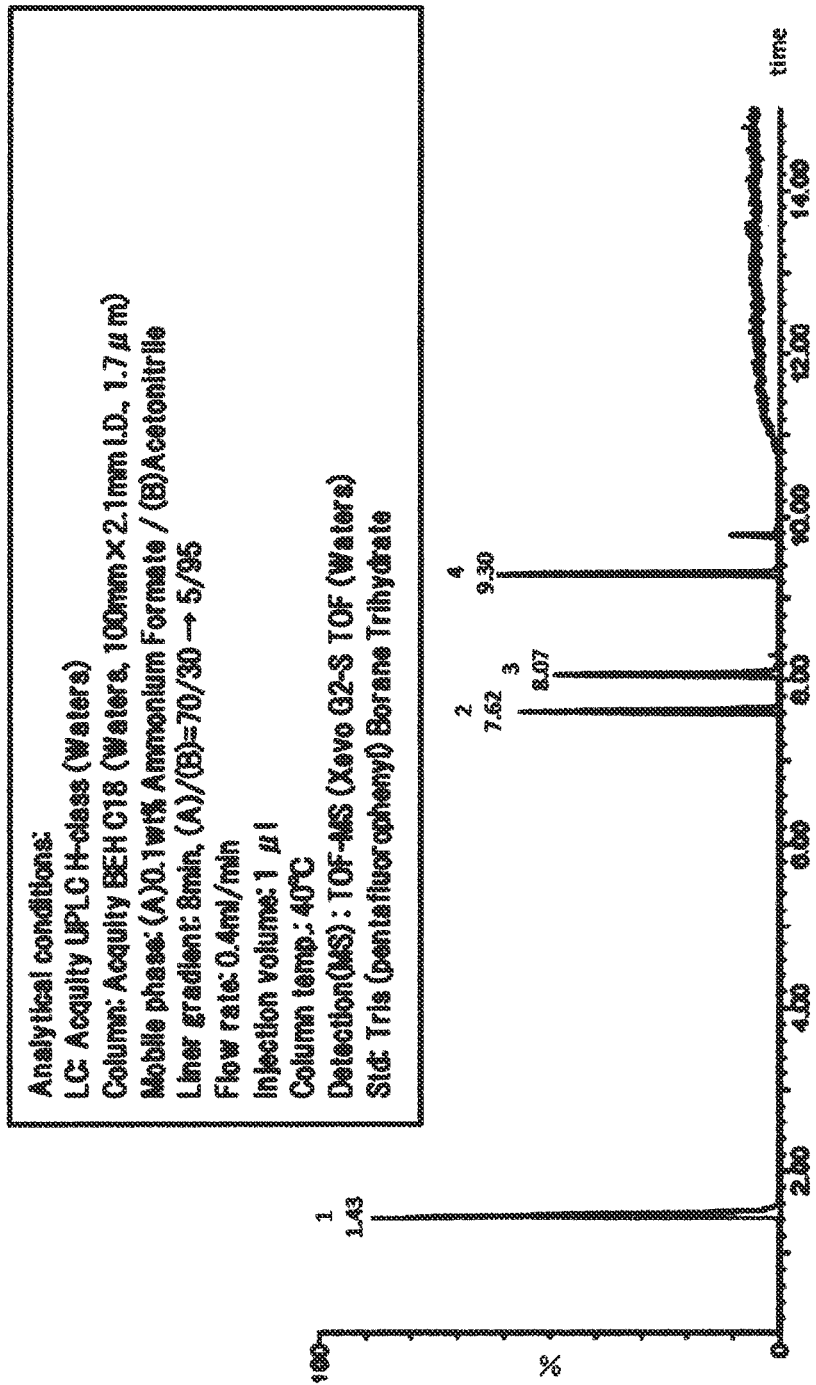
FIG. 3 shows a mass chromatogram of tris(pentafluorophenyl)borane trihydrate in hexafluoroisopropanol/methanol solution.

The solution for creating a calibration curve used for quantitation was obtained by dissolving 20 mg of tris(pentafluorophenyl)borane trihydrate (standard) in 2 mL of hexafluoroisopropanol, followed by performing serial dilution with methanol. When this solution was subjected to LC-MS (ESI–) analysis, as shown in FIG. 3, tris(pentafluorophenyl)borane was detected as a hexafluoroisopropanol adduct or a methanol adduct or a water adduct. The sum of the area values of the derivatives was calculated as an equivalent value of tris(pentafluorophenyl)borane.

Regarding the results of quantitation, it was found that 0.5 µg of a tris(pentafluorophenyl)borane derivative was contained relative to 1 g of the oxymethylene copolymer. Relative to the amount of tris(pentafluorophenyl)borane trihydrate used for the preparation of the oxymethylene copolymer, the recovery rate was 25%.

(Layered Double Hydroxide)

Hydrotalcite (hereinafter sometimes referred to as "HT") as a layered double hydroxide was quantified by analyzing an ash content obtained after burning the final sample by means of XRD.

Figure 4:
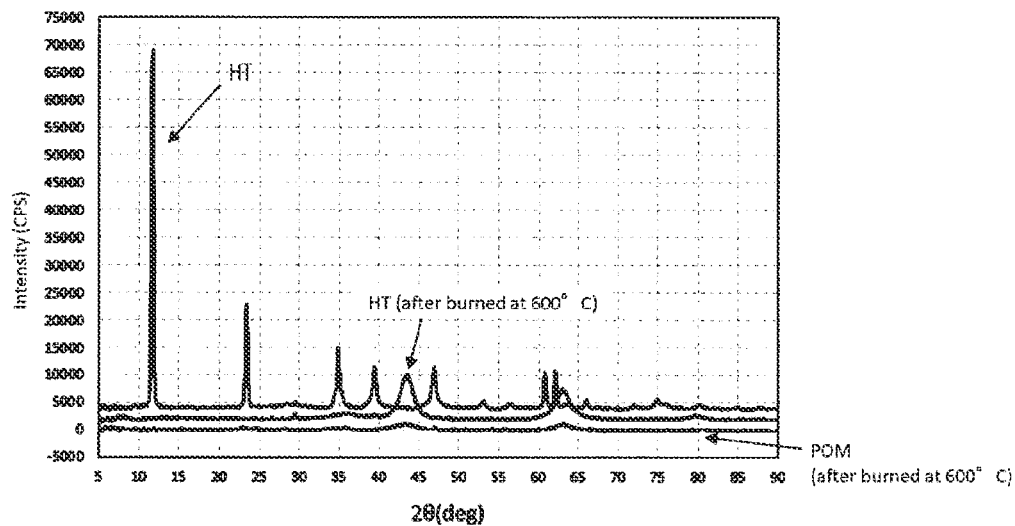
FIG. 4 shows XRD patterns of the sample obtained in Example 7.

A sample was prepared by the below-described procedure. 50 g of the final sample was burned at 280° C. for 7 hours and then burned in an electric furnace at 600° C. for 1 hour to obtain 0.003 g of an ash content. The obtained ash content was measured by an X-ray diffractometer (MiniFlex600 manufactured by RIGAKU). The results are shown in FIG. 4. Based on the measurement results, it was identified as a layered double hydroxide and quantified as the layered double hydroxide, wherein a weight loss due to burning was taken into consideration.

Figure 5:
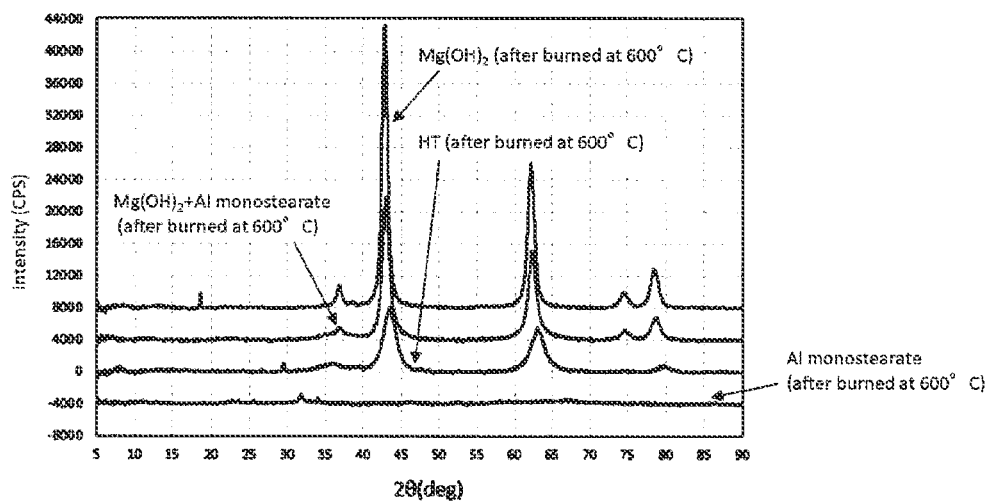
FIG. 5 shows XRD patterns of a burned product of magnesium hydroxide, a burned product of aluminum monostearate, a burned product of a mixture of magnesium hydroxide and aluminum monostearate and a burned product of hydrotalcite.

It was confirmed that hydrotalcite contained in the oxymethylene copolymer can be identified by XRD analysis by measuring a burned product of magnesium hydroxide, a burned product of aluminum monostearate, a burned product of a mixture of magnesium hydroxide and aluminum monostearate and a burned product of hydrotalcite, as shown in FIG. 5.

Regarding the results of quantitation, it was found that 0.005 g of hydrotalcite was contained relative to 1 g of the oxymethylene copolymer.

(Boron Trifluoride Compound)

The final sample was dissolved using hydrochloric acid. The obtained solution was analyzed by a ICP emission spectrophotometer (ICP-OES Optima8300DV, manufactured by PerkinElmer) to quantify the amount of boron (B3). The amount of boron derived from the boron trifluoride compound (B2) was calculated according to formula (2) below.

$$(B2) = (B3) - (B1) \quad (2)$$

(Here, B3 is the total amount of boron in the sample, B2 is the amount of boron derived from the boron trifluoride compound in the sample, and B1 is the amount of boron derived from the aryl fluoride boron compound in the sample. B1 was obtained by conversion of the concentration of the aryl fluoride boron compound obtained by the above-described LC-MS analysis into the amount of boron.)

Regarding the results of quantitation, the amount of boron derived from the boron trifluoride compound (B2) contained in 1 g of the oxymethylene copolymer was 3.5 ppm. In the calculation, the amount of boron derived from the aryl fluoride boron compound (B1) was 0.01 ppm according to the above-described results of HPLC. Accordingly, the value of B1/B2 (molar ratio) was 0.003.

The invention claimed is:

1. An oxymethylene polymer resin composition, which contains an oxymethylene polymer containing an oxymethylene unit and a fluorine adduct of an aryl fluoride boron compound,
   wherein the fluorine adduct of the aryl fluoride boron compound is derived from the aryl fluoride boron compound and a boron trifluoride compound represented by $BF_3 \cdot (X)_n$, wherein n represents 0 or 1, and X represents an alkyl ether having 2 to 20 carbon atoms, tetrahydrofuran or phenol, and
   wherein a molar ratio (B1/B2) of the amount of boron derived from the aryl fluoride boron compound (B1) to the amount of boron derived from the boron trifluoride compound (B2) is 0.0001 to 0.1.

2. The oxymethylene polymer resin composition according to claim 1, wherein the oxymethylene polymer is an oxymethylene copolymer containing an oxymethylene unit and an oxyalkylene unit having 2 or more carbon atoms.

3. The oxymethylene polymer resin composition according to claim 1, wherein the aryl fluoride boron compound is selected from the group consisting of tris(pentafluorophenyl)borane, bis(pentafluorophenyl)fluoroborane and pentafluorophenyldifluoroborane, hydrates thereof, and combinations thereof.

4. A method for producing the oxymethylene polymer resin composition of claim 1, wherein the oxymethylene polymer is produced by polymerizing a cyclic oligomer of formaldehyde, and
   wherein a boron trifluoride compound (A) represented by $BF_3 \cdot (X)_n$, wherein n represents 0 or 1, and X represents an alkyl ether having 2 to 20 carbon atoms, tetrahydrofuran or phenol, and an aryl fluoride boron compound (B) are used as polymerization catalysts and wherein the molar ratio (B1/B2) of the amount of boron derived from the aryl fluoride boron compound (B1) to the amount of boron derived from the boron trifluoride compound (B2) is 0.0001 to 0.1.

5. The method for producing an oxymethylene polymer resin composition according to claim 4, wherein said X is selected from the group consisting of dimethyl ether, diethyl ether dibutyl ether, and combinations thereof.

6. The method for producing an oxymethylene polymer resin composition according to claim 4, wherein the aryl fluoride boron compound (B) selected from the group consisting of tris(pentafluorophenyl)borane, bis(pentafluorophenyl)fluoroborane and pentafluorophenyldifluoroborane, hydrates thereof, and combinations thereof.

7. The method for producing an oxymethylene polymer resin composition according to claim 4, wherein the aryl fluoride boron compound (B) is used at a molar ratio in a range of 0.0001 or more but less than 1 relative to the boron trifluoride compound (A).

8. The method for producing an oxymethylene polymer resin composition according to claim 4, wherein the aryl fluoride boron compound (B) is mixed with the boron trifluoride compound (A) in advance to prepare a polymerization catalyst mixture and the polymerization catalyst mixture is used.

9. The method for producing an oxymethylene polymer resin composition according to claim 4, wherein the cyclic oligomer is trioxane.

10. The method for producing an oxymethylene polymer resin composition according to claim 4, wherein the cyclic oligomer is used as a principal monomer and the principal monomer and a comonomer are copolymerized.

11. The method for producing an oxymethylene polymer resin composition according to claim 10, wherein the comonomer is a cyclic ether or a cyclic formal, and
wherein the cyclic ether or cyclic formal has at least one carbon-carbon bond.

12. The method for producing an oxymethylene polymer resin composition according to claim 10, wherein the comonomer is copolymerized in an amount of 0.1 to 20 parts by mass relative to 100 parts by mass of the principal monomer.

13. The method for producing an oxymethylene polymer resin composition according to claim 10, wherein the boron trifluoride compound (A) is used in an amount of $1\times10^{-6}$ mol to $1\times10^{-4}$ mol relative to 1 mol of the principal monomer.

* * * * *